United States Patent [19]

Brown et al.

[11] Patent Number: 5,702,799
[45] Date of Patent: Dec. 30, 1997

[54] SLIP RESISTANT TEXTURE FOR WET SKIN CONTACT SURFACES

[75] Inventors: David Brown, Milliken; Paul von der Lippe; Susan von der Lippe, both of Loveland, all of Colo.

[73] Assignee: Colorado Time Systems Inc., Loveland, Colo.

[21] Appl. No.: 374,479

[22] Filed: Jan. 17, 1995

[51] Int. Cl.⁶ .................................................. B32B 9/00
[52] U.S. Cl. ........................... 428/143; 428/147; 428/212; 428/240; 428/283; 428/290; 428/351; 428/352; 428/518; 428/607
[58] Field of Search .............................. 428/212, 607, 428/147, 240, 283, 143, 290, 351, 352, 518; 106/36; 156/279, 274.8, 275.5

[56] References Cited

U.S. PATENT DOCUMENTS

| | | | |
|---|---|---|---|
| 3,944,763 | 3/1976 | Beierwalts | 200/52 R |
| 4,006,364 | 2/1977 | Suter | 307/119 |
| 4,137,356 | 1/1979 | Shoemaker et al. | 428/211 |
| 4,204,532 | 5/1980 | Lind et al. | 128/132 |
| 4,475,016 | 10/1984 | Berger | 200/52 R |
| 4,476,358 | 10/1984 | Capecchi | 200/52 |
| 4,587,355 | 5/1986 | Brown et al. | 562/414 |
| 4,603,494 | 8/1986 | Lehrman | 38/140 |
| 4,657,403 | 4/1987 | Morgan et al. | 368/6 |
| 4,743,971 | 5/1988 | Hugli | 358/213 |
| 4,780,085 | 10/1988 | Malone | 434/254 |
| 4,937,127 | 6/1990 | Haenggi et al. | 428/148 |
| 5,015,037 | 5/1991 | Giblin et al. | 297/452 |
| 5,285,428 | 2/1994 | Rosow et al. | 368/107 |
| 5,308,271 | 5/1994 | Foulke | 441/74 |
| 5,445,670 | 8/1995 | Each et al. | 106/3 |

*Primary Examiner*—Patrick Ryan
*Assistant Examiner*—Abraham Bahta
*Attorney, Agent, or Firm*—Holme Roberts & Owen

[57] ABSTRACT

A novel texture for providing improved gripping of bare skin on wet surfaces is disclosed. In one embodiment, the novel texture is employed on a swimming pool touchpad assembly (10) at a start/finish end wall (12) of a swimming pool (14). The texture includes distributed ultra-fine particles (44) having a dimension of less than 100 microns and, preferably, less than 50 microns, and provides an unexpected "dry" feeling for enhanced slip resistance.

21 Claims, 2 Drawing Sheets

SLIP RESISTANT TEXTURE FOR WET SKIN CONTACT SURFACES

FIELD OF THE INVENTION

This invention relates to slip resistant textures and, more specifically, to textures for providing improved gripping of bare skin on wet surfaces. The invention is particularly suited for use in connection with swimming pool touchpads.

BACKGROUND OF THE INVENTION

In a number of applications, it is desirable to provide a slip resistant texture for bare skin on wet surfaces. Examples of such applications include swimming pool and hot tub decks and surfaces, bathtub and shower room surfaces, boat decks and surfboard or sailboard surfaces. In these applications, improved gripping may be desired for safety purposes or for enhanced performance or enjoyment.

A particularly challenging application of slip resistant textures relates to swimming pool touchpads used in the timing of competitive swimming events. Such touchpads are positioned at an end of a swimming pool to provide timing information in response to a sensed touch by a swimmer. During races, the touchpads are typically contacted by swimmers' feet in flip turns and by swimmers' hands at the end of the race, at the ends of relay race legs and during turns for various strokes, i.e., breaststroke or butterfly.

The touchpad surface is also contacted by a swimmer's feet at the start of backstroke races. Specifically, the rules of swim race governing bodies commonly require the swimmer to have both hands in contact with the pool end, gutter or starting platform and both feet in contact with the pool end which includes the touchpad. Certain governing bodies currently require that the swimmers' feet, including the toes, be positioned beneath the water surface. In other events, swimmers have been allowed to wrap their toes over a pool edge for the backstroke start. The swimmer springs from this position at the starting signal. Ideally, the swimmer pushes upwardly out of the water and assumes an arched position to re-enter the water with minimum resistance.

In order to achieve an ideal backstroke start, it is important that the swimmer feel steady in the starting position and that sufficient grip is provided when the swimmer pushes off of the vertical end wall to consistently achieve the desired upward and outward momentum without slipping.

In a variety of applications, the problem of slip resistant textures for wet skin contact surfaces has been addressed by providing either a tacky coating or a coarse texture. A tacky coating can be provided by applying a weak water tolerant adhesive to the surface. Coarse textures have been provided in the form of foams, coarsely gritted paints, friction tapes and other abrasives. Coarsely gritted paints have been utilized in the context of swimming pools and touchpads. In the latter regard, governing body rules require or recommend that touchpad markings conform with and superimpose on existing marking of the pool, i.e., the conventional target lines which are typically about 12 inches (30.48 cm) wide. Grooves and other coarse textures have also been incorporated into touchpad surfaces.

SUMMARY OF THE INVENTION

The present inventors have recognized that conventional tacky coatings and coarse textures are not ideally suited for certain skin contact surface applications, including swimming pool touchpads. Tacky coatings sometimes feel somewhat slippery when wet. Additionally, tacky coatings as well as some coarse textures can wear off as a result of extended use. Various coarse textures can be problematic for certain applications due to unacceptable thickness, irregular surfaces which can interfere with steady footing and/or difficulty of cleaning or susceptibility to contamination/dirt accumulation. It has further been recognized that coarse surfaces can be a distraction or irritate wet skin, which is particularly susceptible to abrasion, upon repeated or high pressure contact.

The present invention is based in part on the discovery that certain ultra-fine textures provide surprising slip resistance for bare skin on wet surfaces. That is, these textures, which can be characterized as feeling relatively smooth in comparison to conventional coarse textures when dry, provide an unexpected gripping characteristic for bare skin when wet. In particular, it has been observed that the textures of the present invention seem to feel "dry" when submerged. Although this phenomenon is not fully understood, it is theorized that this surprising characteristic may relate to interaction of the textures with skin markings or texture, or to a meniscal interaction between the water and portions of the texture.

In accordance with one aspect of the present invention, this phenomenon is advantageously employed to provide a method and assembly for resisting slipping of bare skin on an exposed surface of a structure for use in a wet environment, e.g., a hot tub or pool, touchpad, bathtub or shower room, boat deck, surfboard, sailboard or other wet environment surface. The assembly comprises a texture pad including a base sheet of water resistant material and an ultra-fine texture formed on a front surface of the base sheet.

The water resistant base sheet is formed from material which is resistant to degradation in a wet environment and is preferably water repellant or impermeable, for example, a polymeric material such as plastic film. The ultra-fine texture includes projections distributed over the front surface of the film, wherein the projections have a dimension of less than about 100 microns. Preferably, the projections have a dimension of less than about 50 microns and, more preferably, a dimension between about 5 and 40 microns. The projections can be formed as an integral part of the base sheet or as separate particles suitably adhered to the base sheet. The particles are preferably a hard, water insoluble crystalline or non-crystalline material, for example, aluminum oxide.

A back surface of the base sheet is attached to the exposed surface of the structure, which typically comprises a hard, substantially non-porous material such as PVC, polycarbonate or other polymeric material, enamel, metal or the like, using a permanent adhesive having an ultimate peel strength of at least about 30 oz./in and more preferably at least about 60 oz./in. The ultimate peel strength is determined relative to a 90° peel (normal to surface) of at least a 12 inch sheet and is measured in units of force per inch of width of the sheet peeled. Additionally, the adhesive is preferably stable over time under such use conditions. In this regard, it will be appreciated that some adhesives, apart from their measured peel strengths, can gradually fail under pressure. The permanent adhesive is preferably water resistant, i.e., insoluble, substantially non-absorbent or otherwise resistant to water degradation, tolerant of chemicals which may be present in the water environment (e.g., chlorine or bromine) and plasticizers or other agents which may be found in the structure, and is somewhat elastic to retain contact with flexible structure surfaces. The adhesive may be applied separately or provided as a backing of the base sheet covered by a release sheet for peel-and-stick application. A sealant can be utilized about the periphery of the adhesive interface to further guard against any water damage to the adhesive.

According to another aspect of the present invention, a slip resistant swimming pool touchpad apparatus is provided. The apparatus includes: a pad assembly disposed on an end of a swimming pool and extending across at least a portion of a swimming lane; a timing system associated with the pad assembly for providing time-related information in response to a sensed touch of the pad assembly by a swimmer; and a texture, disposed on a front surface of the pad assembly and extending across at least a first area of the front surface, for providing an enhanced frictional characteristic to the pad assembly. The first area has a width of at least about 0.5 meters, a depth of at least about 0.25 meters and more preferably at least about 0.5 meters, and includes a vertical center axis of the touchpad assembly. The texture includes distributed surface projections having a dimension of less than about 100 microns, preferably less than about 50 microns, and more preferably between about 5–40 microns, and facilitates pushing off from the pad assembly by a swimmer, for example, in a backstroke start.

BRIEF DESCRIPTION OF THE DRAWINGS

For a more complete understanding of the present invention and further advantages thereof, reference is now made to the following Detailed Description, taken in conjunction with the drawings, in which.

DETAILED DESCRIPTION OF THE INVENTION

Figure 1:
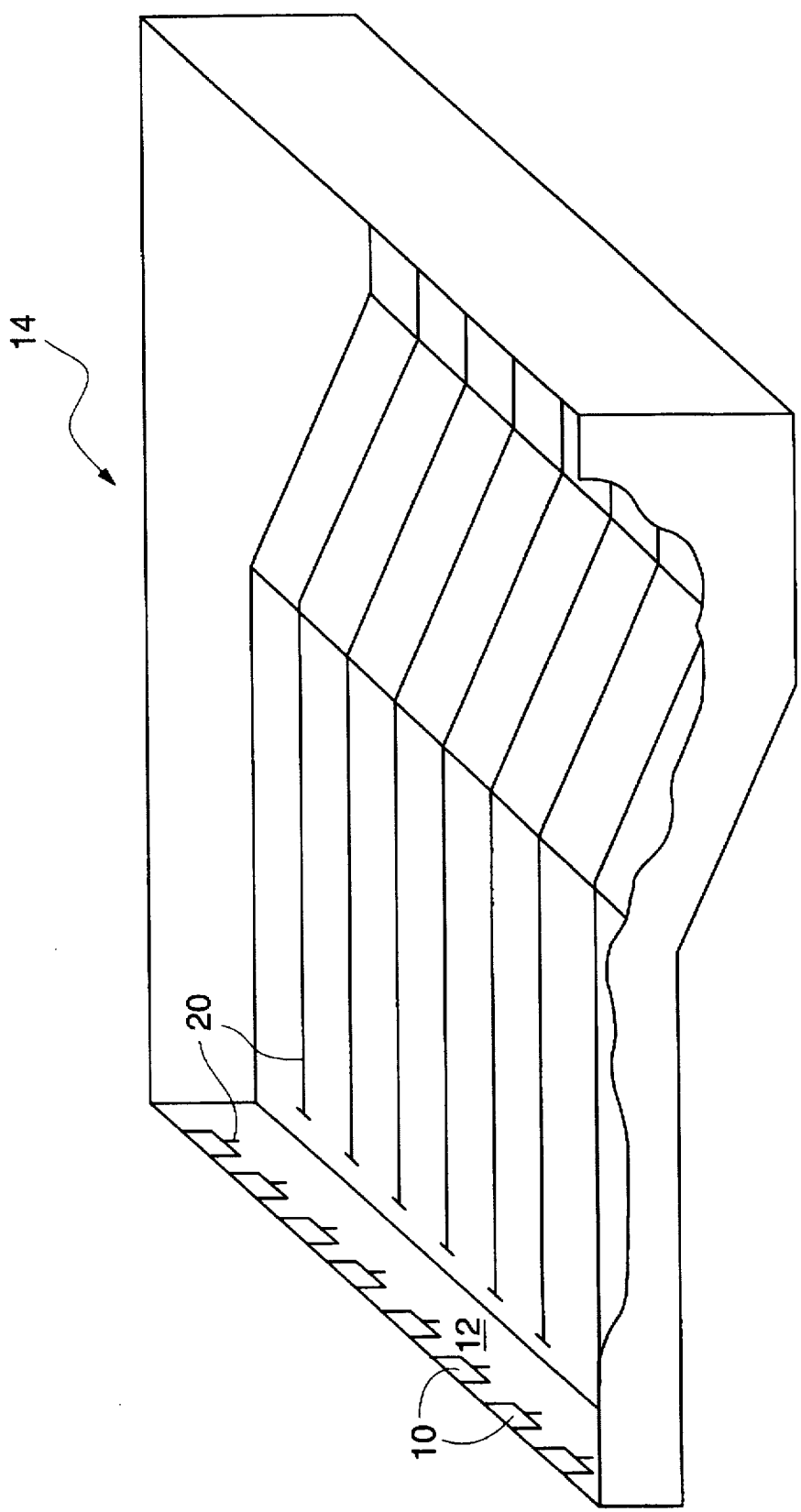
FIG. 1 is a perspective view of a swimming pool showing touchpads of the present invention positioned on an end wall.

The present invention is described below with respect to a swimming pool touchpad embodiment. However, it will be appreciated that various aspects of the invention are applicable to other slip resistant, wet, skin contact surface applications. Referring to the figures, the slip resistant touchpad assembly of the present invention is generally identified by the reference numeral 10. The assembly 10 is positioned on a start/finish end wall 12 of a pool 14 for timing swimming events. In the illustrated embodiment, the assembly 10 is provided as a separate unit for attachment to the end wall 12. However, it will be appreciated that the assembly 10 can be incorporated into a pool structure. Generally, the touch pad assembly 10 includes a touch pad sensor unit subassembly (touch pad subassembly) 16 and a texture surface subassembly 18.

Figure 2:
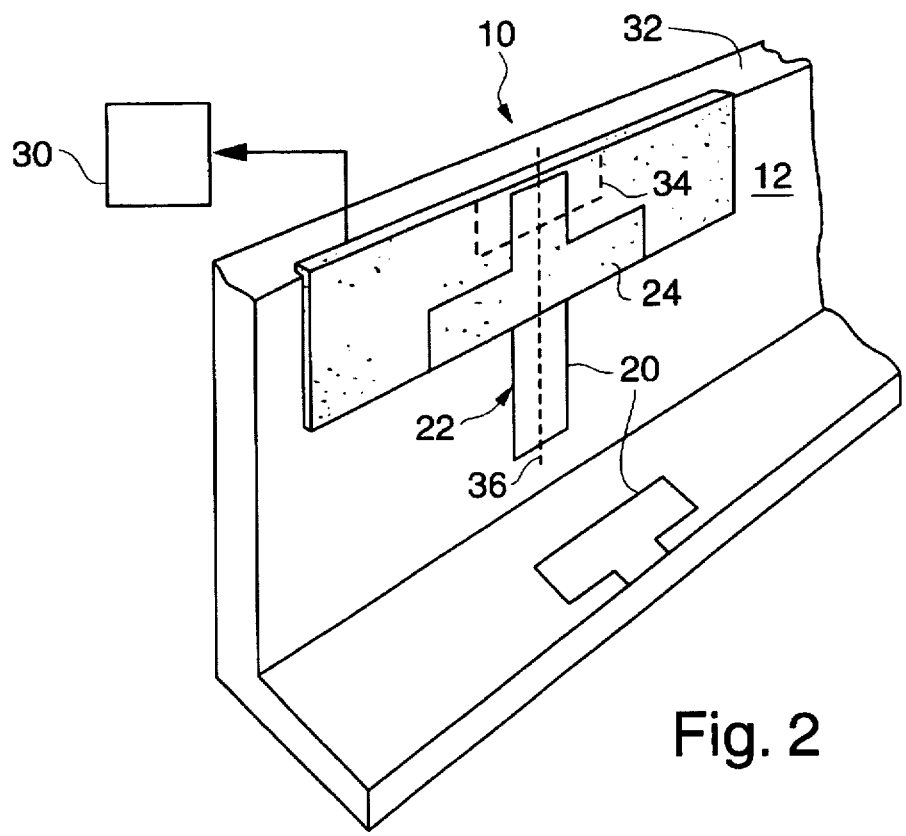
FIG. 2 is a perspective view of one of the touchpads of FIG. 1.

The conventional markings 20, as most clearly shown in FIG. 2, are provided in accordance with National Collegiate Athletic Association rules and include an end wall cross 22 comprised of approximately 12 inch (30.48 cm) sections. As shown, a portion of the existing pool marks, including the widened portion 24 of the cross located approximately mid-depth on the wall 12, are reproduced in superimposed relationship relative to the existing pool markings 20 on assembly 10. Conventionally, these markings 20 may be provided via coarse grit paint. In the illustrated embodiment, the markings 20 are painted or printed on the front surface 26 of touch pad subassembly 16 before covering with transparent or translucent texture surface subassembly 18. If desired, or where subassembly 18 is formed from opaque materials, markings 20 may be provided on a front surface 28 of texture surface subassembly 18. The markings 20 can also be provided on a back or internal surface of subassembly 18 to ensure that the printing does not interfere with the texture characteristics.

The touchpad subassembly 16 can be any of various touchpad units which are well-known in the art such as the system marketed by Colorado Time Systems, of Loveland, Colo. The internal features of the touchpad subassembly 18, which are not necessary to understanding the improved gripping characteristic of the present invention, are omitted from the figures for purposes of clarity. Functionally, the touchpad subassembly 16 senses a touch by a swimmer such as at the end of a race and provides an appropriate signal to the associated timing system (generally indicated by box 30) in response to the sensed touch so as to provide a split time, finishing elapsed time or other time-related information. Typically, the touchpad subassembly 16 is somewhat flexible so as to mechanically react, e.g., flex or vibrate, in response to the swimmer's touch thereby actuating the touchpad sensor. The subassembly 16 can be constructed from plasticized PVC or polycarbonate Due to its positioning on the start/finish end wall 12 of pool 14, the assembly 10 is commonly contacted by a swimmer's hand(s) at the race end, relay leg end or in breast stroke or butterfly turns and by a swimmer's feet in flip turns. In addition, the swimmer's feet will be positioned against assembly 10 for backstroke starts. For the backstroke start, the swimmer's hands are ordinarily positioned on handles of a starting block (not shown) above the pool deck 32.

To resist slipping of the swimmer's feet when positioning for the backstroke start and pushing off from the wall 12, the texture surface subassembly 18 extends at least across push-off area 34. The push-off area 34 is at least about 0.5 meters across and, more preferably, at least about 1 meter across and extends downwardly from the upper edge of assembly 10 or the water surface level downwardly at least about 0.25 meters and, more preferably, at least about 0.5 meters. Additionally, the area covered by the texture surface subassembly 18 is preferably located about vertical center axis 36 of assembly 10. In the illustrated embodiment, texture surface subassembly 18 extends over the entire front surface 26 of assembly 10 to further provide slip resistance for off-center flip turns and to avoid edges where undesired peeling could be initiated. The illustrated subassembly 18 thus has an area of about 6.5 feet (1.98 meters) wide by about 2 feet (0.61 meters) deep although other sizes are possible.

Figure 3:
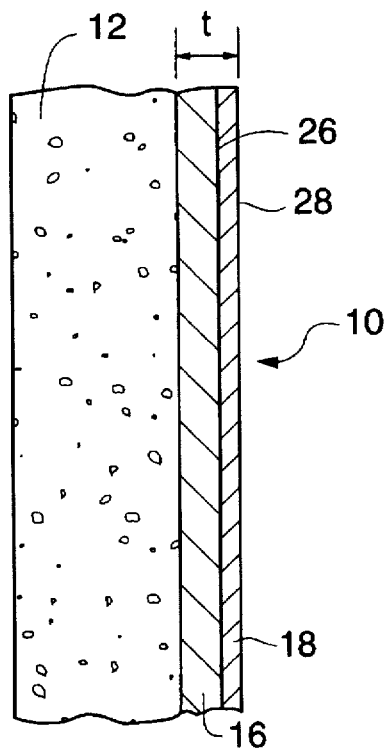
FIG. 3 is a side cross-sectional view of the touchpad of FIG. 2 with internal cross-sectional details omitted for purposes of clarity.

A profile of assembly 10 on end wall 12 is shown in FIG. 3. In order to enhance timing accuracy and conform to the rules of swim race governing bodies, it is desirable to minimize the thickness, t, of assembly 10. The illustrated assembly 10 has a thickness, t, of less than about 0.5 inches (1.27 cm) and can be less than about 0.375 inches (0.95 cm). In this regard, it will be appreciated that it is desirable to minimize the thickness of the texture surface subassembly 18 as existing touch pads may be close to tolerance limits prior to application of the subassembly 18. The subassembly 18 of the illustrated embodiment meets this objective through a thin film and ultra-fine particle construction as described below.

Figure 4:
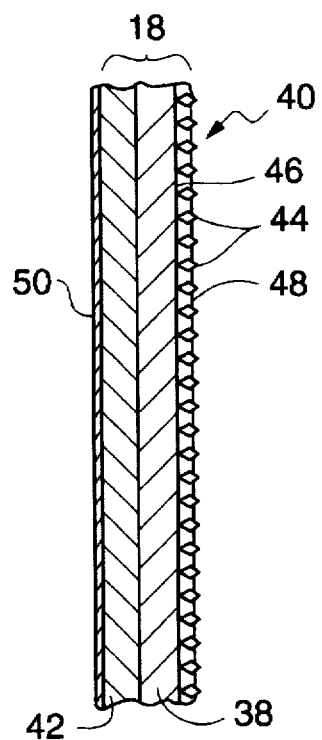
FIG. 4 is a side cross-sectional view of the texture surface subassembly of the present invention.

Referring to FIG. 4, a pre-application configuration of the texture surface subassembly 18 is shown, together with an optional release sheet backing 50 which allows for convenient peel-and-stick application of the subassembly 18 to front surface 26 (FIG. 3) of touchpad subassembly 16. The embodiment of FIG. 4 allows for convenient retro-fitting of subassembly 18 to existing touchpad products or separation of assembly manufacturing steps. However, it will be appreciated that the assembly 10 can be formed in an integrated manufacturing process. The subassembly 18 includes a base sheet 38 sandwiched between a particle layer 40 and an adhesive backing. The base sheet 38 is formed from a water resistant material and preferably is formed of a relatively stiff polymer based material to reduce stretching which could compromise adhesive bonds. The illustrated base sheet 38 comprises mylar which advantageously provides a highly smooth and flat base.

The particle layer 40 includes distributed particles 44 affixed to the front 46 of base sheet 38 by adhesive 48. To enhance gripping, the particles 44 are preferably formed from a hard crystalline or non-crystalline material. In particular, the particles preferably have a Mohs scale hardness of at least about 7 (at least about as hard as quartz) and more preferably at least about 9 (at least about as hard as Sapphire). The illustrated particle layer includes substantially a single layer of crystalline aluminum oxide crystalline particles having a front projection grain size of less than about 100 microns, more preferably, less than about 50 microns and, most preferably, between about 5 microns and about 40 microns, for example, about 9, 15, 20 or 30 microns.

The particles 44 are preferably electrostatically aligned during construction so that a major axis of substantially each particle is oriented perpendicularly to the front 46 of base sheet 38. This can be accomplished by applying a first sublayer of the adhesive 48, electrostatically aligning the particles 44 and applying the remainder of adhesive 48 as a second sub-layer. 3M of St. Paul, Minn. provides a suitable base sheet and particle layer in the form of 9, 15, 30 and 40 micron ultra-fine bond paper for disk sanders under the trademark Imperial Microfinishing Film. However, these products are provided with a temporary adhesive which allows for easy removal. In the illustrated embodiment, adhesive backing 42 comprises a water-resistant adhesive having an ultimate peel strength of at least 30 oz./in and, more preferably at least 60 oz./in.

In addition, the adhesive backing 42 is preferably tolerant of chemicals which may be found in the pool environment such as chlorine or bromine and is compatible with the surface material of touchpad subassembly 16 which may be plasticized PVC or polycarbonate. In particular, where a plasticized PVC is employed, the adhesive bond should resist degradation due to the plasticizer. The illustrated adhesive backing comprises an acrylic based adhesive such as the adhesive designated F-9469 manufactured by 3M. The release sheet backing 50 can be any suitable release material such as various teflon coated papers and plastics. A seal may be provided about the edge of subassembly 16 to further guard against peeling.

The assembly 10 can thus be constructed by providing a touchpad subassembly 16 such as a conventional touchpad, providing a texture surface subassembly 18 with a release sheet backing 50, peeling the release sheet backing 50 to expose adhesive backing 42, and using adhesive backing 42 to apply the texture surface subassembly 18 over at least the push-off area 34 of texture surface subassembly 18. Alternatively, texture surface subassembly can be directly formed on touchpad subassembly 16 in an integrated manufacturing process. An improved, slip resistant touchpad assembly 10 is thereby provided.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed is:

1. A slip-resistant swimming pool touchpad apparatus for use in a swimming pool containing water defining a water line in said swimming pool, said apparatus comprising:

pad means, disposed in a substantially vertical orientation at an end of a swiping pool and extending across at least a potion of a swiping lane of said swiping pool, for use in sensing a touch by a swimmer, said pad means including a front surface facing inwardly towards an inside of said swimming pool, wherein at least a first portion of said front surface of said pad means is positionable underwater below said water line of said swimming pool,;

timing means, operatively associated with said pad means, for providing time-related information relative to a sensed touch of said pad means by the swimmer; and texture means, disposed on said front surface of said pad means and extending at least across a first area of said first portion of said front surface positionable underwater below said water line, for providing an enhanced underwater frictional characteristic to said pad means, said first area having a width of at least about 0.5 meters and extending across a vertical center axis of said pad means, and said tenure means including backing layer and particles affixed thereto defining distributed surface projections having a dimension of less than about 100 microns, wherein said tenure means facilitates underwater pushing off from said pad means by the swimmer.

2. The apparatus of claim 1, wherein said first area of said front surface has a depth of at least about 0.25 meters.

3. The apparatus of claim 1, wherein said first area of said front surface has a depth of at least about 0.5 meters.

4. The apparatus of claim 1, wherein said texture means extends substantially entirely over said front surface of said pad means.

5. The apparatus of claim 1, wherein said distributed surface projections have a dimension of less than about 50 microns.

6. The apparatus of claim 1, wherein said distributed surface projections have a dimension of between about 5–40 microns.

7. The apparatus of claim 1, wherein said front surface of said pad means comprises a non-porous material and said apparatus further comprises an adhesive disposed between said pad means and said texture means, said adhesive providing an ultimate peel strength of at least about 30 oz./inch.

8. The apparatus of claim 7, wherein said front surface of said pad means comprises a non-porous material and said apparatus further comprises an adhesive disposed between said pad means and said texture means, said adhesive providing an ultimate peel strength of at least about 60 oz./inch.

9. The apparatus of claim 1, wherein said texture means comprises a water resistant base sheet and said particles are affixed to said base sheet.

10. The apparatus of claim 9, wherein said particles comprise a crystalline material.

11. The apparatus of claim 9, wherein said particles have a Mohs scale hardness of at least about 7.

12. The apparatus of claim 9, wherein said particles have a Mohs scale hardness of at least about 9.

13. An assembly for resisting slipping of bare skin relative to a structure for use in an underwater environment, said structure including a non-porous outer surface for interfacing with said bare skin, said assembly comprising:

a texture pad including:
- a base sheet of water resistant material;
- particles distributed over at least a portion of an outer surface of said base sheet, said particles having a dimension of less than about 100 microns; and
- means for affixing said particles on said outer surface of said base sheet; and permanent adhesive means, disposed on an inner surface of said base sheet opposite said outer surface, for attachment of said base sheet to said outer surface of said structure, said permanent adhesive providing an ultimate peel strength of at least about 30 oz/inch when applied to said outer surface of said structure;

wherein said particles on said outer surface of said base sheet provide enhanced slip resistance for said bare skin when said assembly is underwater.

14. The assembly of claim 13, wherein said base sheet comprises a polymeric material.

15. The assembly of claim 13, wherein said particles have a dimension of less than about 50 microns.

16. The assembly of claim 13, wherein said particles have a dimension of between about 5–40 microns.

17. The assembly of claim 13, wherein said permanent adhesive means provides an ultimate peel strength of at least about 60 oz./inch when applied to said outer surface of said structure.

18. The assembly of claim 13, further comprising a release sheet applied to said adhesive means.

19. The apparatus of claim 1, wherein said particles are affixed to said backing layer via a waterproof adhesive material.

20. The apparatus of claim 1, wherein said backing layer is secured to said front surface of said means via a waterproof adhesive material.

21. A slip-resistant swimming pool touchpad apparatus for use in a swimming pool containing water defining a water line in said swimming pool, said apparatus comprising:

a pad assembly, disposed in a substantially vertical orientation at an end of a swimming pool and extending across at least a portion of a swimming lane of said swimming pool, for use in sensing a touch by a swimmer, said pad assembly including a front surface facing inwardly towards an inside of said swimming pool, wherein at least a first portion of said front surface of said pad assembly is positionable underwater below said water line;

a timing system, operatively associated with said pad assembly, for providing time-related information relative to a sensed touch of said pad assembly by the swimmer; and a texture pad, affixed on a first side to said first portion of said front surface of said pad assembly via a first waterproof adhesive material comprising acrylic and extending at least across a first area of said first portion of said front surface positionable underwater below said water line, for providing an enhanced frictional characteristic to said pad assembly in said underwater environment, said texture pad including a backing layer and particles affixed thereto via a second waterproof adhesive material on a second side opposite to the first side, said particles defining distributed surface projections having a dimension of between about 5 microns and about 40 microns, wherein said texture pad facilitates underwater pushing off from said pad assembly by the swimmer.

\* \* \* \* \*

UNITED STATES PATENT AND TRADEMARK OFFICE
CERTIFICATE OF CORRECTION

PATENT NO. : 5,702,799
DATED : December 30, 1997
INVENTOR(S) : David Brown; Paul von der Lippe; and Susan von der Lippe It is certified that error appears in the above-identified patent and that said Letters Patent is hereby corrected as shown below:

Column 6, Claim 1, line 12, please delete "swiping" and insert therefor --swimming--.
6, Claim 1, line 13, please delete "potion" and insert therefor --portion--.
6, Claim 1, line 13, please delete both occurrences of "swiping" and insert therefor --swimming--.
Claim 1, line 19, please delete ",".
Claim 1, line 31, please delete "tenure" and insert therefor --texture--.
6, Claim 1, line 34, please delete "tenure" and insert therefor --texture--.

Signed and Sealed this

Third Day of March, 1998

*Attest:*

BRUCE LEHMAN

*Attesting Officer*  Commissioner of Patents and Trademarks